United States Patent
Alwine

(10) Patent No.: US 11,252,205 B1
(45) Date of Patent: Feb. 15, 2022

(54) REAL TIME INFORMATION ANALYSIS FOR A TELECONFERENCE

(71) Applicant: Fuze, Inc., Boston, MA (US)

(72) Inventor: Michael Alwine, Boston, MA (US)

(73) Assignee: Fuze, Inc., Boston, MA (US)

( * ) Notice: Subject to any disclaimer, the term of this patent is extended or adjusted under 35 U.S.C. 154(b) by 0 days.

(21) Appl. No.: 17/071,908

(22) Filed: Oct. 15, 2020

(51) Int. Cl.
*H04L 29/06* (2006.01)
*G06F 16/9032* (2019.01)
*G06F 16/955* (2019.01)
*G06F 16/9536* (2019.01)

(52) U.S. Cl.
CPC .... *H04L 65/4015* (2013.01); *G06F 16/90332* (2019.01); *G06F 16/9536* (2019.01); *G06F 16/9558* (2019.01); *H04L 65/4053* (2013.01)

(58) Field of Classification Search
CPC ........... G06F 16/90332; G06F 16/9536; G06F 16/9558; H04L 65/4015; H04L 65/4053
See application file for complete search history.

(56) References Cited

U.S. PATENT DOCUMENTS

| | | | | |
|---|---|---|---|---|
| 7,818,458 B2* | 10/2010 | Andersen | ................ | G06F 9/543 709/248 |
| 7,870,493 B2* | 1/2011 | Pall | ..................... | H04L 12/1831 715/751 |
| 8,214,242 B2* | 7/2012 | Agapi | .................. | G06Q 10/109 705/7.19 |
| 8,738,374 B2* | 5/2014 | Jaroker | .................. | G06Q 10/00 704/235 |
| 9,100,539 B2* | 8/2015 | Sanso | ...................... | H04N 7/15 |
| 9,257,115 B2* | 2/2016 | Waibel | ................. | G06F 40/174 |
| 9,672,829 B2* | 6/2017 | Chen | ....................... | G10L 25/57 |
| 10,629,189 B2* | 4/2020 | Peters | ................. | G10L 15/1822 |
| 2011/0125501 A1* | 5/2011 | Holtel | ...................... | G10L 15/22 704/251 |
| 2011/0270609 A1* | 11/2011 | Jones | ...................... | H04M 3/56 704/235 |
| 2016/0285928 A1* | 9/2016 | Sanso | ................... | G06F 40/166 |

* cited by examiner

*Primary Examiner* — Thomas J Dailey
(74) *Attorney, Agent, or Firm* — McDermott Will & Emery LLP

(57) ABSTRACT

Methods, systems, and storage media for real time information analysis for a teleconference are disclosed. Exemplary implementations may: receive, at a subscriber server, a voice stream from a first participant in a teleconference; convert at least a portion of the voice stream into a string of characters; select a keyword from a subset of the string of characters; access a network search engine and presenting the keyword as a query for the network search engine; receive a search result returned by the network search engine based on the query; analyze the search result for ancillary content based on the semantic context of the voice stream; and provide the ancillary content for display in a device used by a second participant in the teleconference.

19 Claims, 12 Drawing Sheets

FIG. 6B

REAL TIME INFORMATION ANALYSIS FOR A TELECONFERENCE

BACKGROUND

Field

The present disclosure generally relates to teleconference and related communications. More specifically, the present disclosure relates to systems, methods, and storage media for real time information analysis for a teleconference.

Description of Related Art

Current platforms can provide a voice communication channel between two or more participants to enable participation in a conference call. The conference call may be established as a traditional teleconference (e.g., speaker and microphone), a video conference, and/or may include screen sharing by one or more of the participants. Regardless of whether the calling service is provided via traditional phone service (e.g., a landline), mobile phone service, Voice over Internet Protocol (VoIP), and/or other online services, the participants typically only receive limited identifying information about the other participant(s). Little, if any, ancillary information (e.g., about a topic of discussion) is provided to the participants.

By way of illustration, current communication platforms may include features such as "caller ID" to provide a name and contact information of one or more participants to the other participant(s). However, the conferencing service is typically limited in the type of information that may be retrieved from the participants. For example, the caller ID feature uses a telephone number, login name, e-mail address and/or other specific ID to identify participants. Thus, the information that can be provided to the conference participants is limited to the specific IDs used by the caller ID feature.

SUMMARY

One aspect of the present disclosure relates to a method to collect information analysis for a teleconference. The method includes receiving, at a subscriber server, a voice stream from a first participant in a teleconference. The method includes converting at least a portion of the voice stream into a string of characters. The method includes selecting a keyword from a subset of the string of characters. The keyword is indicative of a semantic context of the voice stream. The method includes accessing a network search engine and presenting the keyword as a query for the network search engine. The method includes receiving a search result returned by the network search engine based on the query. The method includes analyzing the search result for ancillary content based on the semantic context of the voice stream. The method includes providing the ancillary content for display in a device used by a second participant in the teleconference.

Another aspect of the present disclosure relates to a system configured for collecting information analysis for a teleconference. The system includes one or more hardware processors configured by machine-readable instructions. The processor(s) is configured to receive, at a subscriber server, a voice stream from a first participant in a teleconference. The processor(s) is configured to convert at least a portion of the voice stream into a string of characters. The processor(s) is configured to select a keyword from a subset of the string of characters. The keyword is indicative of a semantic context of the voice stream. The processor(s) is configured to access a network search engine and present the keyword as a query for the network search engine. The processor(s) is configured to receive a search result returned by the network search engine based on the query. The processor(s) is configured to analyze the search result for ancillary content based on the semantic context of the voice stream. The processor(s) is configured to provide the ancillary content for display in a device used by a second participant in the teleconference.

Yet another aspect of the present disclosure relates to a non-transitory, computer-readable storage medium having instructions embodied thereon, the instructions being executable by one or more processors to perform a method for collecting information analysis for a teleconference. The method includes receiving, at a subscriber server, a voice stream from a first participant in a teleconference. The method includes converting at least a portion of the voice stream into a string of characters. The method includes selecting a keyword from a subset of the string of characters. The keyword are indicative of a semantic context of the voice stream. The method includes accessing a network search engine and presenting the keyword as a query for the network search engine. The method includes receiving a search result returned by the network search engine based on the query. The method includes analyzing the search result for ancillary content based on the semantic context of the voice stream. The method includes providing the ancillary content for display in a device used by a second participant in the teleconference.

Still another aspect of the present disclosure relates to a system configured for collecting information analysis for a teleconference. The system includes means for receiving, at a subscriber server, a voice stream from a first participant in a teleconference. The system includes means for converting at least a portion of the voice stream into a string of characters. The system includes means for selecting a keyword from a subset of the string of characters. The keyword is indicative of a semantic context of the voice stream. The system includes means for accessing a network search engine and presenting the keyword as a query for the network search engine. The system includes means for receiving a search result returned by the network search engine based on the query. The system includes means for analyzing the search result for ancillary content based on the semantic context of the voice stream. The system includes means for providing the ancillary content for display in a device used by a second participant in the teleconference.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIGS. 6A-C illustrate portions of a screenshot of example ancillary content for display in a device used by a participant during a teleconference, according to some embodiments.

In the figures, elements and steps denoted by the same or similar reference numerals are associated with the same or similar elements and steps, unless indicated otherwise.

DETAILED DESCRIPTION

Figure 1:
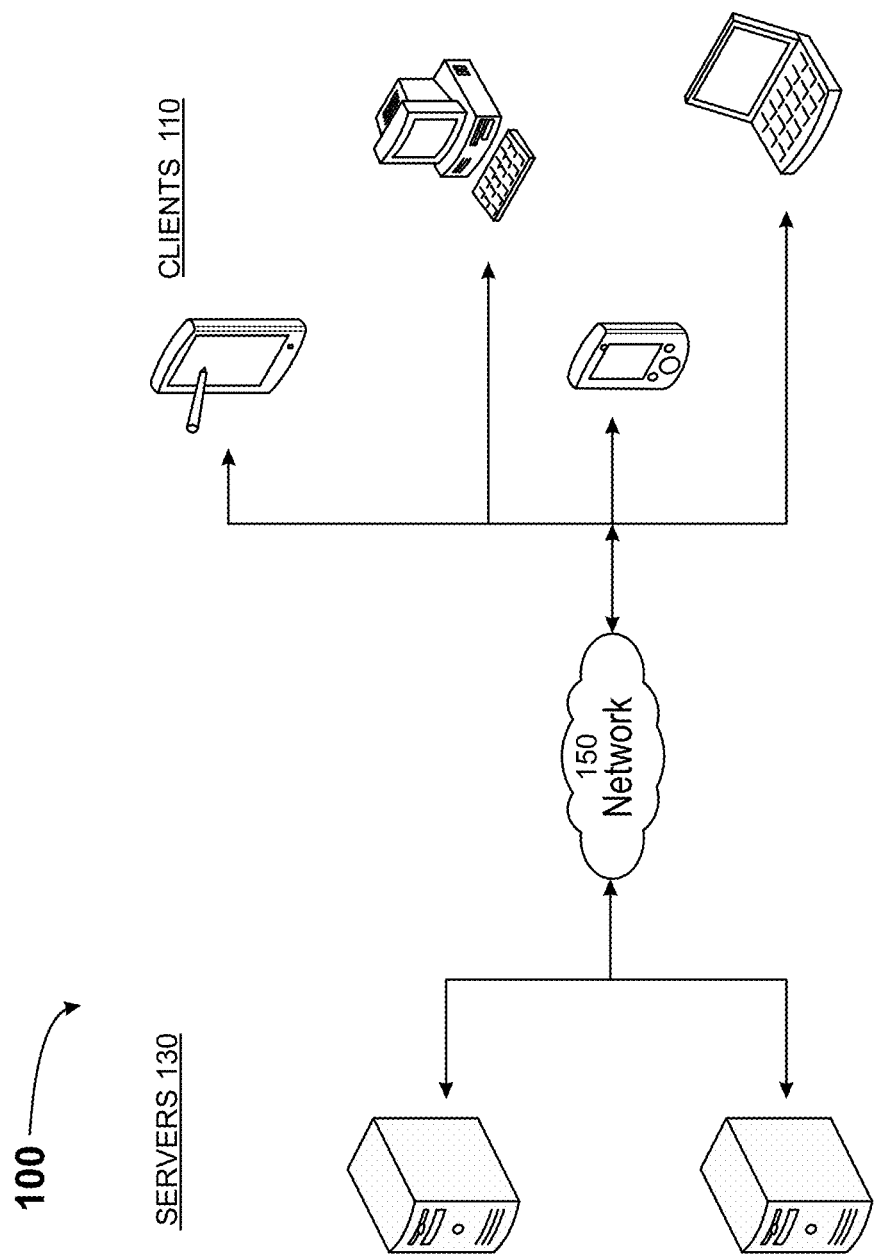
FIG. 1 illustrates an example architecture suitable to provide a platform for real time information analysis for a teleconference, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Current communication platforms providing conference call services are typically limited in the type of information that is provided to the participants. Information that is provided to participants is typically dependent on static sources, such as a telephone number and/or conference login information of the other participant(s). Ancillary information, such as a participant's background and information about a topic of discussion, is typically not available to the other participant(s) unless it is explicitly shared with the other participant(s). This lack of information during a conference call limits participants from actively engaging with the other participants.

Implementations described herein address these and other problems by listening for keywords and topics in a conversation between a subscriber and at least a second participant. The platform is configured to deliver back to the subscriber highlighted news, facts, or statistics regarding the topic being discussed in the conversation, thus equipping the subscriber with critical information and talking points that enhance the conversation.

In some embodiments, a network server that provides a communication platform as disclosed herein may retrieve textual data from a voice channel in a conversation between two or more participants. The platform parses the textual data and provides search queries to network search engines to retrieve the relevant topical information. According to aspects, the string of characters is parsed with a neural network algorithm to select a salient feature as the keyword. The keyword may be from a subject of the string of characters. The keyword is then used to decide how to formulate a path to the information source on the internet.

In some embodiments, the information presented by the platform to the subscriber is already public and would scan sources such as Wikipedia, Wolfram Alpha, Weather Channel, LinkedIn, Facebook, IMDB, Yelp, Answers.com, Bloomberg, and the like.

According to aspects, ancillary content from the search result is downloaded from a content server for display in the device used by the second participant in the teleconference. For example, the ancillary content can include a downloaded document, a downloaded image, a hyperlink to an online server, and/or a link to news, weather, and/or other current events related to the semantic context of the voice stream.

According to aspects, data from the search result is used to form a graphic display that is provided to the device used by the second participant in the teleconference. Forming the graphic display may include combining data from multiple sources in the search result.

Example System Architecture

FIG. 1 illustrates an example architecture 100 suitable to provide a platform for real time information analysis for a teleconference, according to some embodiments. Architecture 100 includes servers 130 and client devices 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a teleconference information analysis event that a participant may access through client device 110. Further, in some embodiments, the processor in server 130 is configured to provide documents including images, video, and text messaging services to a participant in a teleconference information analysis event through client device 110. In some embodiments, the documents provided by server 130 to one or more participants may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, an HTML file, a multi-media file such as a video, audio, image file, or any combination of the above. Information related to, and instructions to handle the teleconference information analysis event may be stored in a teleconference information analysis event engine 242 accessible by a participant through a client device 110 (e.g., accessible through a web page or an application 222 running on client device 110). Servers 130 can return images, documents, rich-text documents, and the like intended for a shared use and modification by multiple participants in a teleconference information analysis event. For purposes of load balancing, multiple servers 130 can host memories including instructions to one or more processors and multiple servers 130 for hosting one or more teleconference information analysis events as disclosed herein.

Servers 130 may include any device having an appropriate processor, memory, and communications capability for hosting the documents and applications associated with teleconference information analysis event engine 242. Teleconference information analysis event engine 242 may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing teleconference information analysis event engine 242 on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
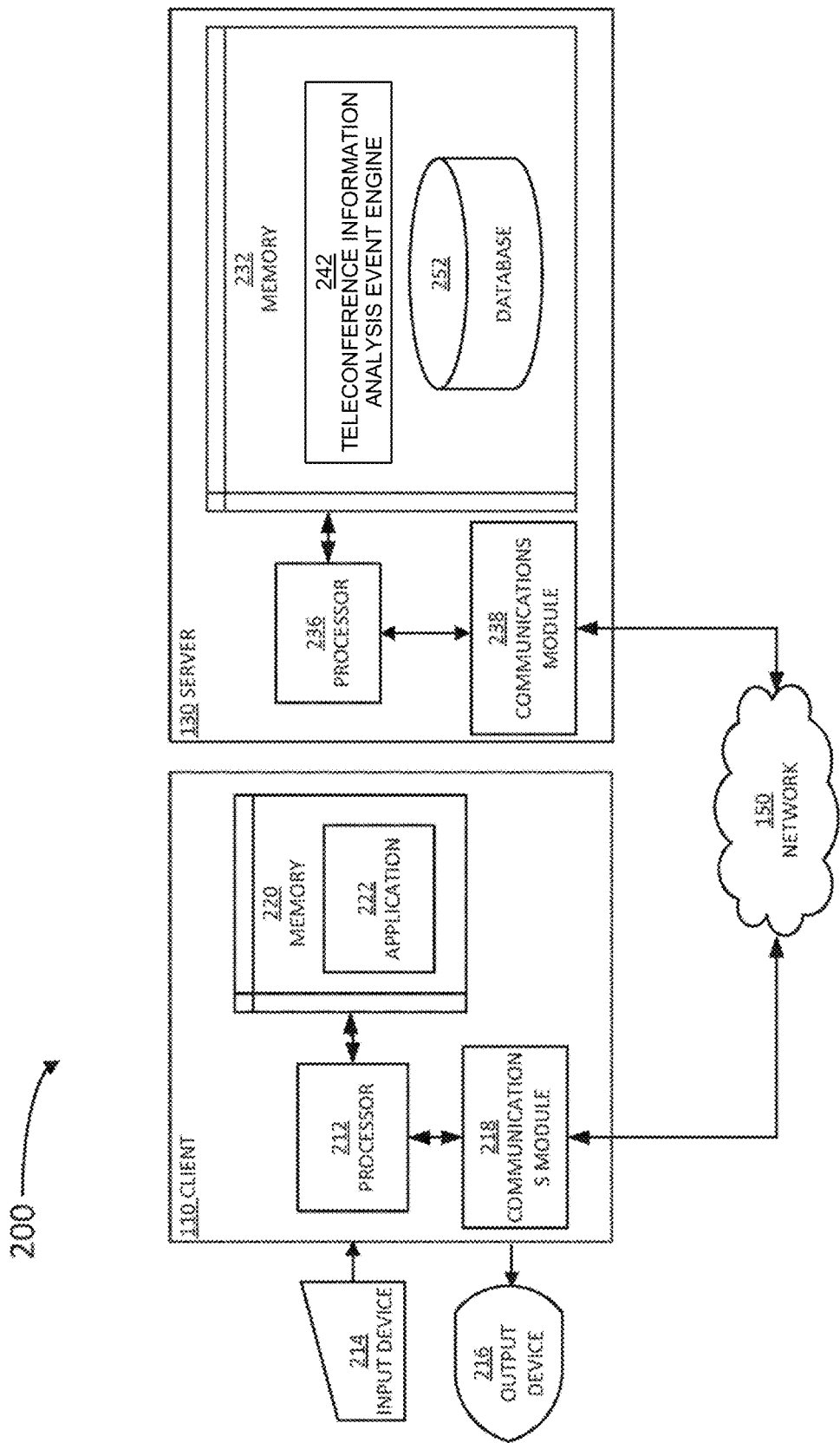
FIG. 2 is a block diagram illustrating an example server and client from the architecture of FIG. 1, according to some embodiments.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Client device 110 may be any one of a desktop computer, a laptop, or a mobile computing device. Client device 110 may include a processor 212 and a memory 220. An input device 214 and an output device 216 enable the user to interact with client device 110. Examples of input device 214 and output device 216 may include a mouse, a keyboard, a display, a touch-interactive display, and the like.

Server 130 includes a memory 232, a processor 236, and communications module 238. The user interface is displayed for the user in an output device 216 of client device 110. Memory 232 includes a teleconference information analysis event engine 242 and a database 252. Teleconference information analysis event engine 242 includes instructions which, when executed by processor 236, cause server 130 to perform at least partially steps as disclosed herein. For example, teleconference information analysis event engine 242 includes instructions to communicate with application 222 to incorporate the user of client device 110 into a teleconference information analysis event as disclosed herein. Teleconference information analysis event engine 242 may also include instructions to store information and other data related to a teleconference information analysis event as disclosed herein into database 252. Furthermore, in some embodiments, teleconference information analysis event engine 242 may include instructions to retrieve at least some of the data in database 252 and provide the data to one or more participants in a teleconference information analysis event as disclosed herein.

In some embodiments, teleconference information analysis event engine 242 stores data in and maintains for a selected period of time, database 252. Further, teleconference information analysis event engine 242 updates different changes and modifications on a document or file discussed during the teleconference information analysis event, as part of a chat/topic history, as stored in database 252. In some embodiments, the activity, notes, and other actions taken by different participants over a document or any other topic item are displayed around the item, showing the specific participant that has participated in the activity. As mentioned above, the document stored by server 130 in database 252 may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, an HTML file, or a multi-media file such as a video, audio, image file, or any combination of the above.

The user may access teleconference information analysis event engine 242 through application 222 installed in memory 220 of client device 110. The user may also access teleconference information analysis event engine 242 via a web browser installed in client device 110. Execution of application 222 may be controlled by a processor 212 in client device 110. In some embodiments, application 222 is downloaded and installed by the user into client device 110, from server 130.

Processor 236 is configured to execute instructions, such as instructions physically coded into processor 236, instructions received from software in memory 232, or a combination of both.

Figure 3:
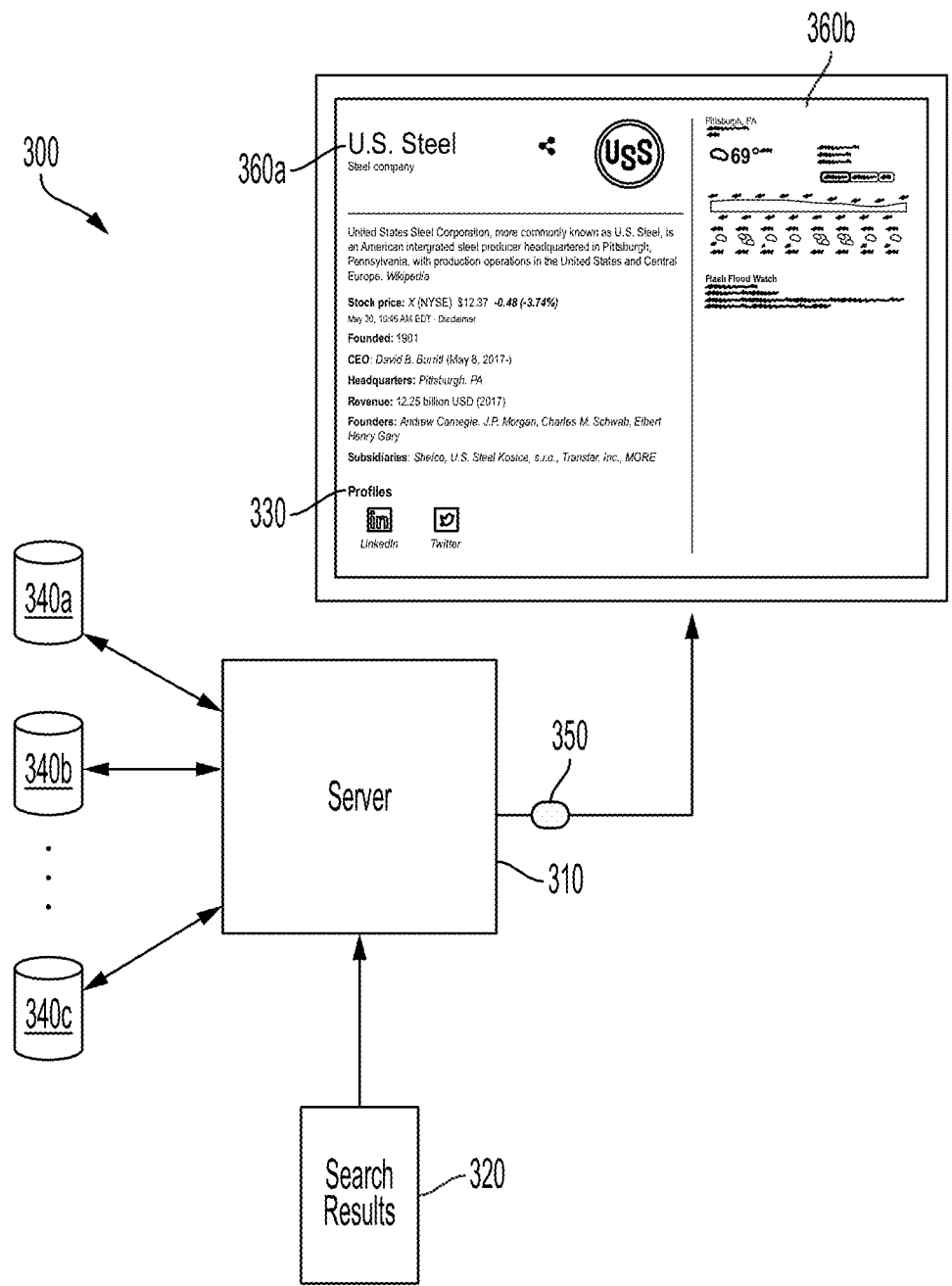
FIG. 3 is a block diagram illustrating forming a graphic display of the ancillary content using data from a search result and providing the graphic display to a device used by a participant during a teleconference, according to some embodiments.

FIG. 3 is a block diagram 300 illustrating forming a graphic display of the ancillary content using data from a search result and providing the graphic display to a device used by a participant during a teleconference, according to some embodiments. According to aspects, a subscriber server 310 analyzes information analysis for a teleconference in real time, based on a voice stream from a first participant in the teleconference. At least a portion of the voice stream is converted into a string of characters, and a keyword is selected from a subset of the string of characters. The keyword is indicative of a semantic context of the voice stream and is presented as a query to a network search engine. According to aspects, the string of characters is parsed with a neural network algorithm to select a salient feature as the keyword. The keyword may be from a subject of the string of characters.

The network search engine provides a search result 320 based on the query. The subscriber server 310 analyzes the search result 320 for ancillary content based on the semantic context of the voice stream and provides the ancillary content for display in a device 330 used by a second participant in the teleconference.

According to aspects, the subscriber server 310 downloads the ancillary content from one or more content servers 340a-c based on the search result 320 and pointed to by the network search engine. Ancillary content may be retrieved from any number of content servers 340a-c and may be configured for display in the device 330 used by the second participant in the teleconference.

According to aspects, the subscriber server 310 forms a graphic display 350 using data from the search result 320.

The graphic display 350 is provided to the device 330 used by the second participant in the teleconference. The graphic display 350 includes formatting for the ancillary data 360a and 360b. Forming the graphic display 350 may include combining data from multiple servers 340a-c based on the search result 320 and pointed to by the network search engine.

Figure 4:
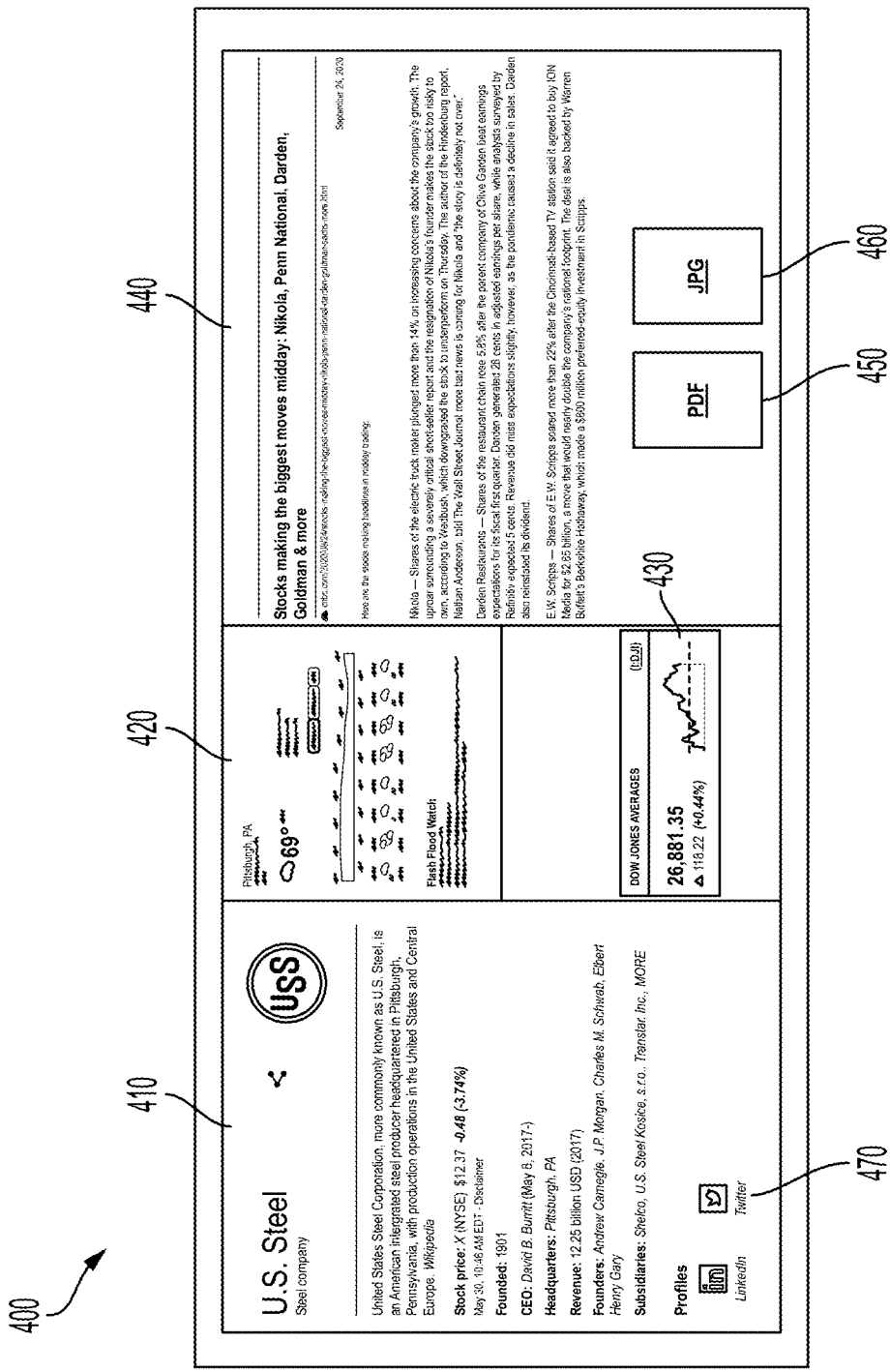
FIG. 4 illustrates a screenshot of various types of example ancillary content for display in a device used by a participant in a system to facilitate providing ancillary content during a teleconference, according to some embodiments.

FIG. 4 illustrates a screenshot 400 of various types of example ancillary content for display in a device used by a participant in a system to facilitate providing ancillary content during a teleconference, according to some embodiments. In an implementation, the ancillary content includes any sort of information relevant to the conversation that is the subject of the teleconference. Example ancillary content may include, but is not limited to, a social media profile 410, a weather report 420, a current event 430, and a news article 440. Other types of ancillary content may include at least one downloaded document 450 related to the semantic context of the voice stream, and/or at least one downloaded image 460 related to the semantic context of the voice stream.

According to aspects, the ancillary content may include a hyperlink 470 to an online server including information related to the semantic context of the voice stream. According to further aspects, the ancillary content may be displayed, e.g., as a text, graphic, or multimedia image. The ancillary content is linked to the search result and pointed to by the network search engine for display in the device used by the second participant in the teleconference.

Figure 5:
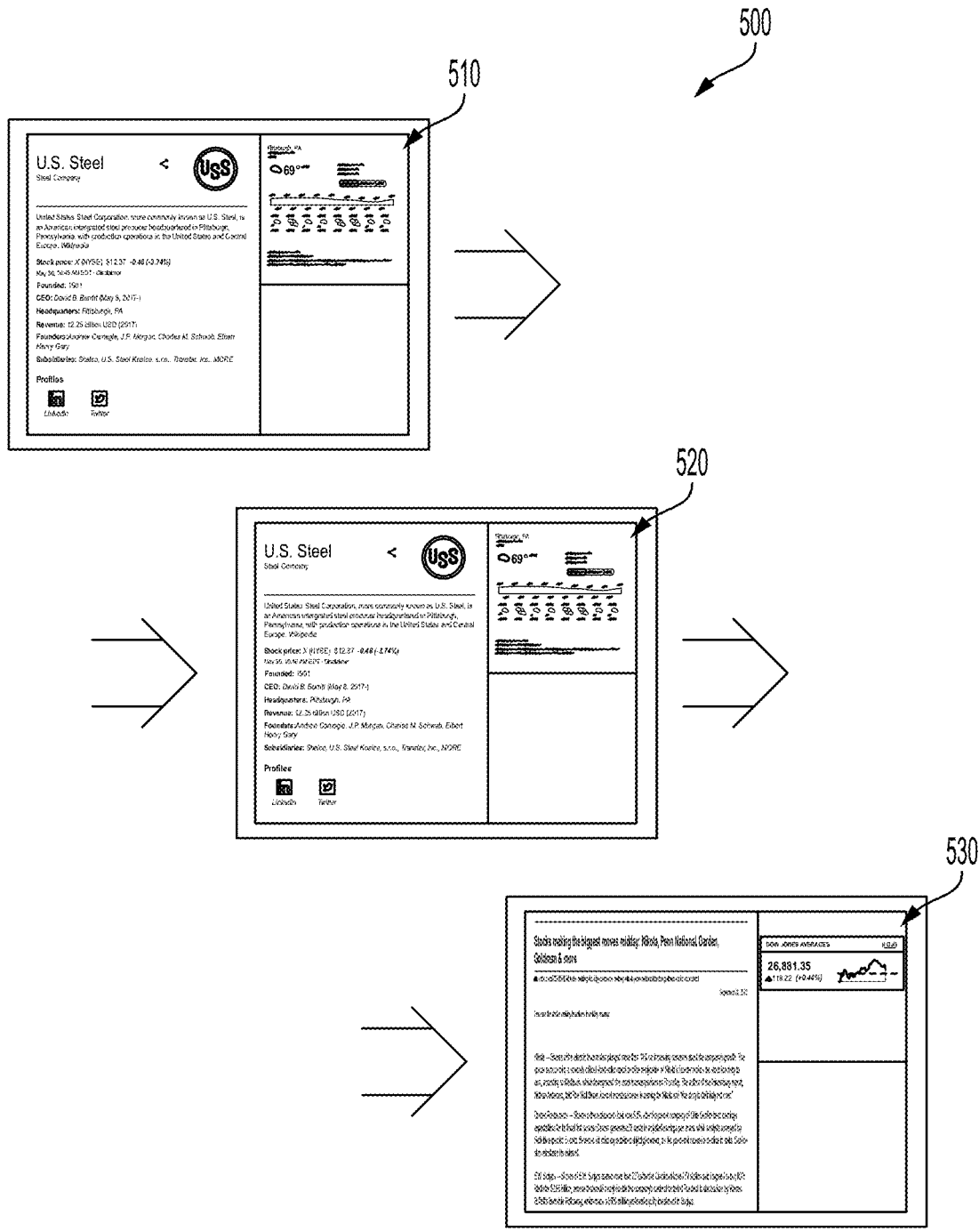
FIG. 5 illustrates screenshots showing expiring the ancillary content displayed over time and refreshing the display to receive new ancillary content during an ongoing teleconference, according to some embodiments.

FIG. 5 illustrates screenshots 500 showing expiring the ancillary content displayed over time and refreshing the display to receive new ancillary content during an ongoing teleconference, according to some embodiments. According to aspects, a subscriber server conducts real time information analysis for a teleconference. In addition, the topic of a discussion may change or evolve over time. For example, a meeting may have one or more topics of discussion, both pre-planned topics and topics which arise as a result of discussing a different topic. As such, the ancillary content 510 displayed in the device of the second participant may be expired over time, e.g., as illustrated by reference 520. The display may be refreshed to receive new ancillary content 530 associated with an updated semantic context of the teleconference over time.

Figure 6A:
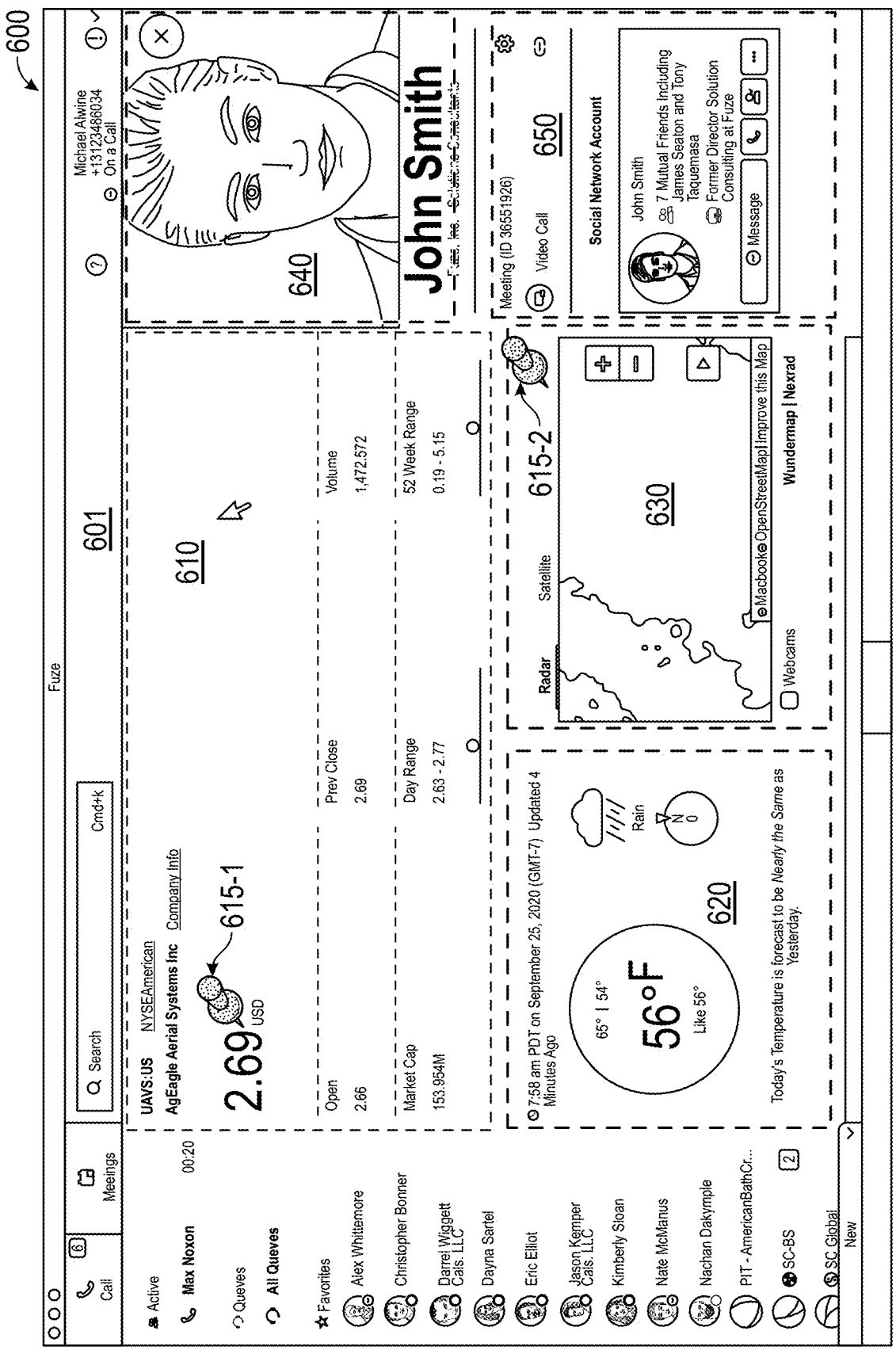
Figure 6B:
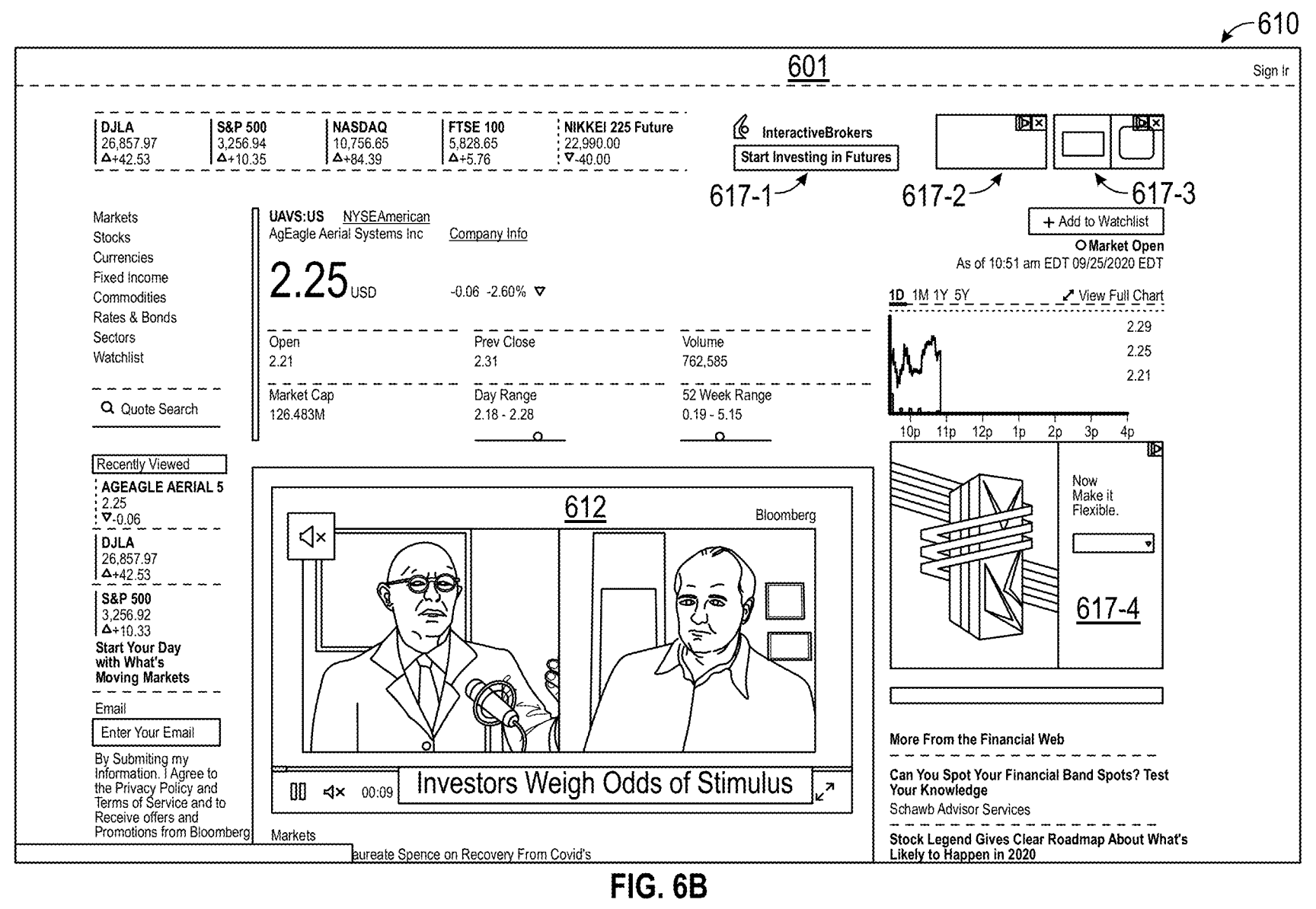
Figure 6C:
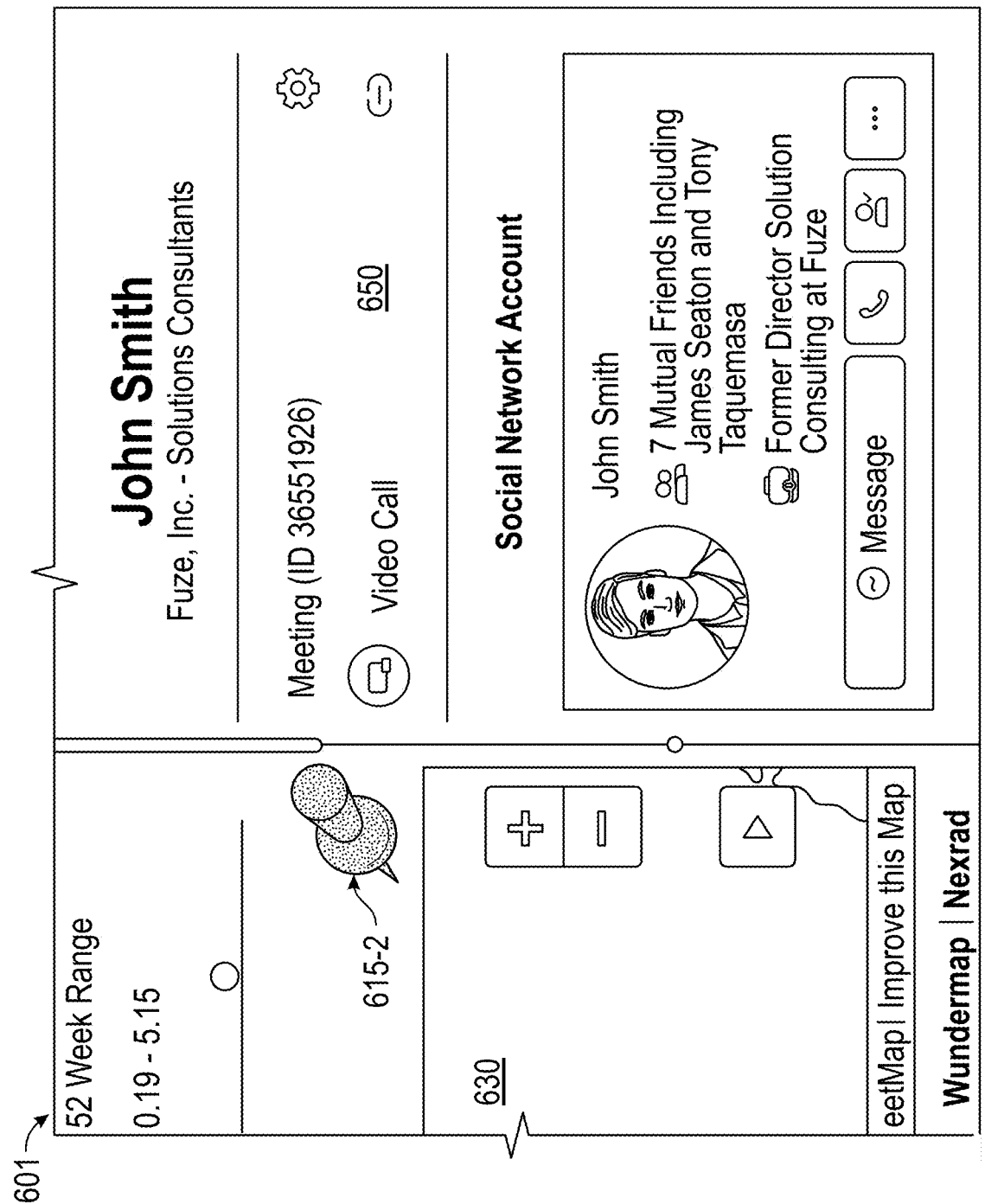

FIGS. 6A-C illustrate portions of a screenshot 600 of example ancillary content for display in a workspace 601 displayed by a device used by a participant during a teleconference, according to some embodiments. The application experience provides rich content retrieval and display to the subscribing user. When a user is logged into the teleconference application, and a call is placed or received, the display is dynamic, providing a tiled space for media to be presented.

FIG. 6A illustrates screenshot 600 displaying, for a participant in a teleconference, ancillary content about a contact (e.g., 'John Smith'), as an array of tiles 610, 620, 630, 640, and 650. For example, a tile 610 may include financial information about a company associated with the contact (e.g., stock value, market capitalization, and other trading information about the company). A tile 620 may include weather information of the current location of the contact (placed in workspace 601 based on the content of the conversation or the exchanges in the teleconference). A tile 630 may include a radar screen indicating the movement of a weather system through the area where the contact resides. A tile 640 may include a picture of the contact, and a tile 650 may include a display of a personal account of the contact in a third party social network.

As the conversation progresses, tiles 610, 620, 630, 640, and 650 may flow in and out of the display in the participant workspace. Accordingly, in some embodiments, workspace 601 includes pin features 615-1 and 615-2 (hereinafter, collectively referred to as "pin features 615") to allow locking a tile in place to prevent refreshing with new information. In some embodiments, each one of tiles 610, 620, 630, 640, and 650 may act as a hyperlink. Accordingly, the user may click anywhere within the tile to open a link in a web browser where further content can be explored, related to the topic illustrated in the tile.

Since the product scans publicly available sources, tile 650 may include social media information pulled into the display and available for the user or participant to browse. Accordingly, some content sources for placing in workspace 601 include third party social networks that can be displayed when a positive match is found on the contact (e.g., 'John Smith,' in tile 650).

FIG. 6B illustrates tile 610 including financial information of an enterprise associated with the contact in the teleconference. In some embodiments, tile 610 may include a link to a multimedia downstream that the user can play simply by clicking on the area of the screen. The multimedia downstream may include a snapshot or a snippet 612 of an audio file or a video file of interest or relevance to the topics of discussion in the teleconference. Further, tile 610 may also include advertisement banners and links 617-1, 617-2, 617-3, and 617-4 (hereinafter, collectively referred to as "advertisement links 617"). Advertising links 617 may be provided by the browser accessed by the hyperlink in tile 610, or may be provided by the teleconference information analysis event engine (e.g., teleconference information analysis event engine 242).

FIG. 6C illustrates in more detail an aspect of tiles 630 and 650, including pin feature 615-2, locking tile 630 in the workspace 601 of the participant. Pin features 615 may have an icon resembling a physical pin, so that the participant may easily identify which tile has been pinned. The participant may de-activate pin features 615 simply by double-clicking, or right-clicking a pointer hovering over the pin icon.

Figure 7:
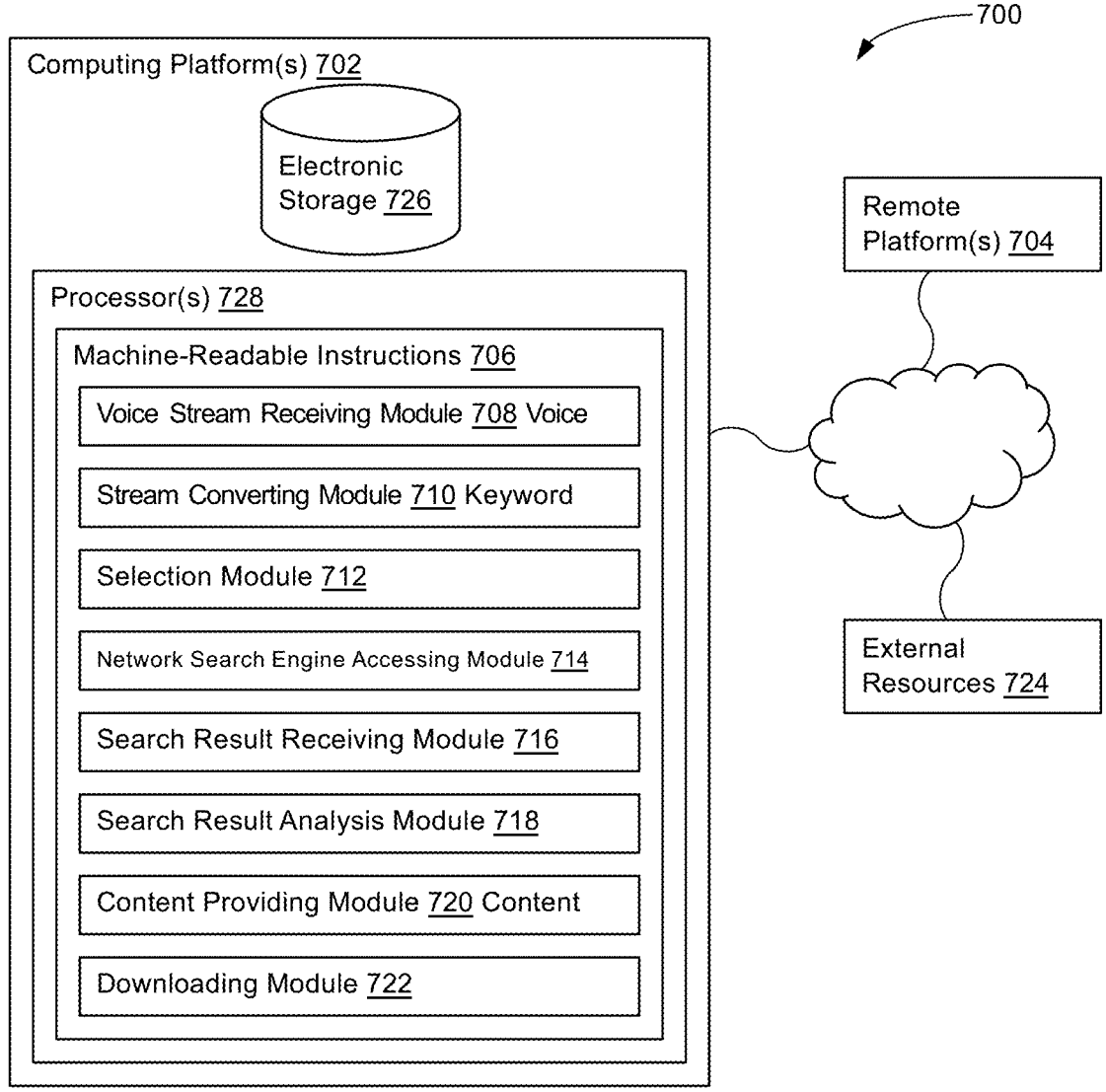
FIG. 7 illustrates an example system for real time information analysis for a teleconference, according to some embodiments.

FIG. 7 illustrates an example system 700 for real time information analysis for a teleconference, according to some embodiments. In some implementations, system 700 may include one or more computing platforms 702. Computing platform(s) 702 may be configured to communicate with one or more remote platforms 704 according to a client/server architecture, a peer-to-peer architecture, and/or other architectures. Remote platform(s) 704 may be configured to communicate with other remote platforms via computing platform(s) 702 and/or according to a client/server architecture, a peer-to-peer architecture, and/or other architectures. Users may access system 700 via remote platform(s) 704.

Computing platform(s) 702 may be configured by machine-readable instructions 706. Machine-readable instructions 706 may include one or more instruction modules. The instruction modules may include computer program modules. The instruction modules may include one or more of voice stream receiving module 708, voice stream converting module 710, keyword selection module 712, network search engine accessing module 714, search result receiving module 716, search result analysis module 718, content providing module 720, content downloading module 722, and/or other instruction modules.

Voice stream receiving module 708 may be configured to receive, at a subscriber server, a voice stream from a first participant in a teleconference. A "subscriber," as the term is used herein, may refer to any participant(s) in the teleconference who have enabled the service disclosed herein. More than one participant may be a subscriber. Different levels of subscribers may participate in the teleconference, including both free and paid options. Not all participants need to be subscribers. It is noted that the participant need not be the one responsible for paying for the service. For example, a participant's employer may be responsible for paying for the service.

An identifier may be selected from the first participant in the teleconference. The term "identifier," as used herein, may refer to any information that can be used to identify a participant. Typically, identifiers include a phone number, an e-mail address, a call handle, a login, or username, but can also include other information provided by the user (e.g., a screen name) or automatically (e.g., an IP address and/or a device ID).

By way of non-limiting example, the first participant may be a subscriber of a platform configured to deliver back to the subscriber highlighted news, facts, or statistics regarding a topic being discussed in a conversation during the teleconference, thus equipping the subscriber with information and talking points that enhance the conversation.

The term "statistics," as the term is used herein, may refer to a fact or other data that is generally considered reliable (e.g., can be fact-checked against a reliable body of information). The term "topic," as the term is used herein, may refer to a subject or matter of a discussion. A discussion may include more than one topic. In addition, the topic of a discussion may change or evolve over time. For example, a meeting may have one or more topics of discussion, both pre-planned topics and topics which arise as a result of discussing a different topic. The term "conversation," as the term is used herein, may refer to a talk or discussion between two or more people during which information and ideas may be exchanged. A conversation may be informal, or may be formal (e.g., based on an agenda). A conversation may change or evolve over time. Additional participants may join and/or leave the conversation at various times.

Voice stream converting module 710 may be configured to convert at least a portion of the voice stream or multiple streams from other subscribers into strings of characters.

Keyword selection module 712 may be configured to select a keyword from a subset of the string of characters. The string of characters may be parsed with a neural network algorithm to select a salient feature as the keyword. The keyword may be from a subject of the string of characters. The keyword may be indicative of a semantic context of the voice stream. The semantic context of the voice stream may include a name for a location.

The term "neural network algorithm," as the term is used herein, may refer to the manipulation of data according to a structure or rules to recognize underlying relationships in data through a process that mimics the human involvement. A neural network algorithm may include more than one algorithm, and several of the algorithms may be interdependent on one another (e.g., the output of one algorithm may feed the input of a separate algorithm). The algorithms may execute simultaneously, independently, or interdependently one another.

The term "salient information," as the term is used herein, may refer to key pieces of distinct information or defining elements that are analyzed or used to understand or decipher a topic of discussion.

The term "semantic context," as the term is used herein, may refer to the concept or topic from one or more sequences of natural language. Semantic context may be inferred from individual words and simple phrases, to more complex phrases, such as but not limited to, statements, queries, answers, and commands.

Network search engine accessing module 714 may be configured to access a network search engine and present the keyword as a query for the network search engine. A "network search engine," as the term is used herein, may refer to a service that searches for content on a network. The network is typically the Internet, but may also include private networks (e.g., a corporate network). The network may include a network of networks (e.g., both private and public networks). The network search engine operates by receiving keywords or key phrases and/or other information (e.g., a user's location), and returns a search result. A "search result," as the term is used herein, may include content results in the form of websites (e.g., hyperlinks), images, videos, or other online data.

Search result receiving module 716 may be configured to receive a search result returned by the network search engine based on the query. A graphic display may be formed using data from the search result. The term "graphic display," as used herein, may refer to the output of hyperlinks, information, files, documents, graphics, media (e.g., photos, videos, or audio), and other content according to any suitable organized format for presentation to the participant.

Forming the graphic display may further include combining data from multiple sources in the search result and pointed to by the network search engine. Accessing the network search engine may include accessing multiple search engines and selecting the search result from at least one of the multiple search engines based on the semantic context of the voice stream.

Search result analysis module 718 may be configured to analyze the search result for ancillary content based on the semantic context of the voice stream. The term "ancillary content," as the term is used herein, may refer to supporting content or information as it relates to the conversation or discussion of the teleconference. The ancillary content may include at least one downloaded document related to the semantic context of the voice stream. The ancillary content may include at least one downloaded image related to the semantic context of the voice stream. The ancillary content may include at least one hyperlink to an online server including information related to the semantic context of the voice stream. The term "online server," as the term is used herein, may refer to a server computer having content available via a public and/or private network address that is pointed to by the hyperlink. A selected piece of the ancillary content may be stored in a recording of the teleconference. The term "selected piece," as the term is used herein, may refer to a portion (some or all) of the ancillary content which is selected by a participant or other user, or automatically by the service (e.g., in response to detecting certain keyword(s) such as "record this").

Content providing module 720 may be configured to provide the ancillary content for display in a device used by a second participant in the teleconference. By way of non-limiting example, at least one news, weather, and/or other current event may be linked to in the search result and pointed to by the network search engine for display in the device used by the second participant in the teleconference. The term "current event," as the term is used herein, may refer to events and issues of general public interest, such as those currently found in the news or other source reporting the event or information.

The graphic display may be provided to the device used by the second participant in the teleconference. The publicly available data from the social network account may be provided for display in the device used by the second participant in the teleconference. The term "social network account," as the term is used herein, may refer to any computer-based social media site(s) providing an online connection with friends, family, colleagues, customers, or clients. Social networking accounts can provide a platform for social and/or business interaction. The ancillary content may be provided for display in a device used by the first participant upon request by the second participant.

The ancillary content displayed in the device of the second participant may be expired over time. The ancillary content displayed in the device of the second participant may be pinned to a clipboard before expiring the ancillary content. The term "clipboard," as the term is used herein, may refer to computer memory configured to temporarily store data (e.g., text or graphics) to facilitate its movement, storage, or duplication. Keywords and topics may be listened for in a conversation between the first participant and the second participant.

Content downloading module 722 may be configured to download, from a content server, the ancillary content from the search result and pointed to by the network search engine, for display in the device used by the second participant in the teleconference. The display may be refreshed to receive new ancillary content associated with an updated semantic context of the teleconference over time.

In some implementations, by way of non-limiting example, a social network account, associated with the identifier, may be accessed. In some implementations, a publicly available data may be downloaded from the social network account. In some implementations, by way of non-limiting example, the topic may include a weather information, a news information, or a graphic information. The term "weather information," as the term is used herein, may refer to past, current, and predicted weather forecasts for an area or region, and may include temperature, precipitation, wind, and other data related to the weather. The term "news information," as the term is used herein, may refer to recent or current information that is generally considered to be important to the community as a whole, as opposed to any particular individual. The term "graphic information," as the term is used herein, may refer to the visual representation of information or data that is output by a computer to be viewed by a user. Other types of information may also be provided, both public and private.

In some implementations, computing platform(s) 702, remote platform(s) 704, and/or external resources 724 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 702, remote platform(s) 704, and/or external resources 724 may be operatively linked via some other communication media.

A given remote platform 704 may include one or more processors configured to execute computer program modules. The computer program modules may be configured to enable an expert or user associated with the given remote platform 704 to interface with system 700 and/or external resources 724, and/or provide other functionality attributed herein to remote platform(s) 704. By way of non-limiting example, a given remote platform 704 and/or a given computing platform 702 may include one or more of a server, a desktop computer, a laptop computer, a handheld computer, a tablet computing platform, a NetBook, a Smartphone, a gaming console, and/or other computing platforms.

External resources 724 may include sources of information outside of system 700, external entities participating with system 700, and/or other resources. In some implementations, some or all of the functionality attributed herein to external resources 724 may be provided by resources included in system 700.

Computing platform(s) 702 may include electronic storage 726, one or more processors 728, and/or other components. Computing platform(s) 702 may include communication lines, or ports to enable the exchange of information with a network and/or other computing platforms. Illustration of computing platform(s) 702 is not intended to be limiting. Computing platform(s) 702 may include a plurality of hardware, software, and/or firmware components operating together to provide the functionality attributed herein to computing platform(s) 702. For example, computing platform(s) 702 may be implemented by a cloud of computing platforms operating together as computing platform(s) 702.

Electronic storage 726 may comprise non-transitory storage media that electronically stores information. The electronic storage media of electronic storage 726 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 726 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 726 may include one or more virtual storage resources (e.g., cloud storage, a virtual private network, and/or other virtual storage resources). Electronic storage 726 may store software algorithms, information determined by processor(s) 728, information received from computing platform(s) 702, information received from remote platform(s) 704, and/or other information that enables computing platform(s) 702 to function as described herein.

Processor(s) 728 may be configured to provide information processing capabilities in computing platform(s) 702. As such, processor(s) 728 may include one or more of a digital processor, an analog processor, a digital circuit designed to process information, an analog circuit designed to process information, a state machine, and/or other mechanisms for electronically processing information. Although processor(s) 728 is shown as a single entity, this is for illustrative purposes only. In some implementations, processor(s) 728 may include a plurality of processing units. These processing units may be physically located within the same device, or processor(s) 728 may represent processing functionality of a plurality of devices operating in coordination. Processor(s) 728 may be configured to execute modules 708, 710, 712, 714, 716, 718, 720, and/or 722, and/or other modules. Processor(s) 728 may be configured to execute modules 708, 710, 712, 714, 716, 718, 720, and/or 722, and/or other modules by software, hardware, firmware, some combination of software, hardware, and/or firmware, and/or other mechanisms for configuring processing capabilities on processor(s) 728. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 708, 710, 712, 714, 716, 718, 720, and/or 722 are illustrated as being implemented within a single processing unit, in implementations in which processor(s) 728 includes multiple processing units, one or more of modules 708, 710, 712, 714, 716, 718, 720, and/or 722 may be implemented remotely from the other modules. The description of the functionality provided by the different modules 708, 710, 712, 714, 716, 718, 720, and/or 722 described below is for illustrative purposes, and is not intended to be limiting, as any of modules 708, 710, 712, 714, 716, 718, 720, and/or 722 may provide more or less functionality than is described. For example, one or more of modules 708, 710, 712, 714, 716, 718, 720, and/or 722 may be eliminated, and some or all of its functionality may be provided by other ones of modules 708, 710, 712, 714, 716, 718, 720, and/or 722. As another example, processor(s) 728 may be configured to execute one or more additional modules that may perform some or all of the functionality attributed below to one of modules 708, 710, 712, 714, 716, 718, 720, and/or 722.

Figure 8:
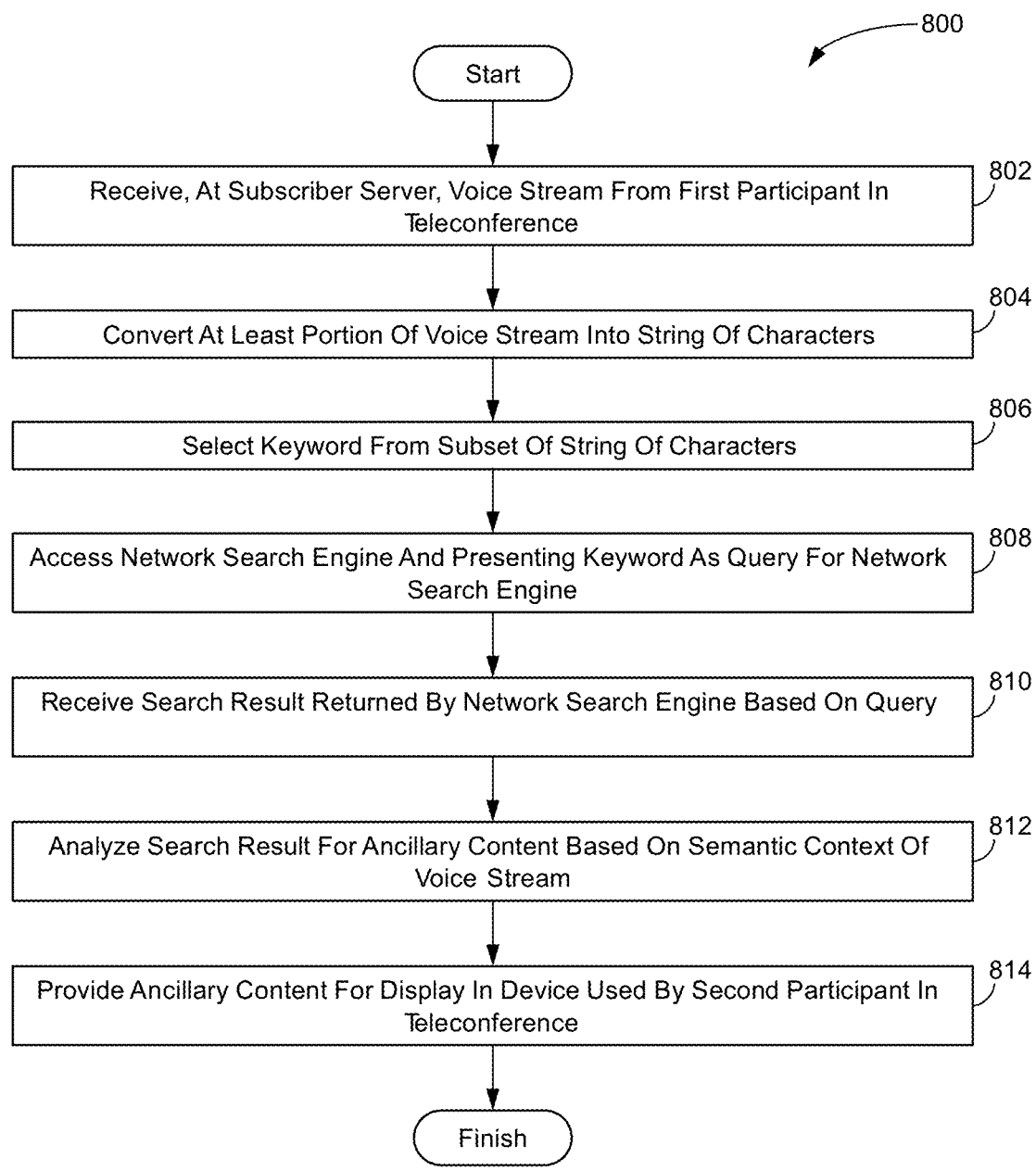
FIG. 8 is a flowchart illustrating steps of a method for real time information analysis for a teleconference, according to some embodiments.

FIG. 8 is a flowchart illustrating steps of a method 800 for real time information analysis for a teleconference, according to some embodiments. For explanatory purposes, the steps of the example method 800 are described herein as occurring in serial, or linearly. However, multiple instances of the example method 800 may occur in parallel. For purposes of explanation of the subject technology, the method 800 will be discussed in reference to FIG. 7.

At step 802, the method 800 may include receiving, at a subscriber server, a voice stream from a first participant in a teleconference. Step 802 may be performed by one or more hardware processors configured by machine-readable instructions including a module that is the same as or similar to voice stream receiving module 708, according to certain aspects of the disclosure.

At step 804, the method 800 may include converting at least a portion of the voice stream into a string of characters. Step 804 may be performed by one or more hardware processors configured by machine-readable instructions including a module that is the same as or similar to voice stream converting module 710, according to certain aspects of the disclosure.

At step 806, the method 800 may include selecting a keyword from a subset of the string of characters. The keyword may be indicative of a semantic context of the voice stream. Step 806 may be performed by one or more hardware processors configured by machine-readable instructions including a module that is the same as or similar to keyword selection module 712, according to certain aspects of the disclosure.

At step 808, the method 800 may include accessing a network search engine and presenting the keyword as a query for the network search engine. Step 808 may be performed by one or more hardware processors configured by machine-readable instructions including a module that is the same as or similar to network search engine accessing module 714, according to certain aspects of the disclosure.

At step 810, the method 800 may include receiving a search result returned by the network search engine based on the query. Step 810 may be performed by one or more hardware processors configured by machine-readable instructions including a module that is the same as or similar to search result receiving module 716, according to certain aspects of the disclosure.

At step 812, the method 800 may include analyzing the search result for ancillary content based on the semantic context of the voice stream. Step 812 may be performed by one or more hardware processors configured by machine-readable instructions including a module that is the same as or similar to search result analysis module 718, according to certain aspects of the disclosure.

At step 814, the method 800 may include providing the ancillary content for display in a device used by a second participant in the teleconference. Step 814 may be performed by one or more hardware processors configured by machine-readable instructions including a module that is the same as or similar to content providing module 720, according to certain aspects of the disclosure.

Figure 9:
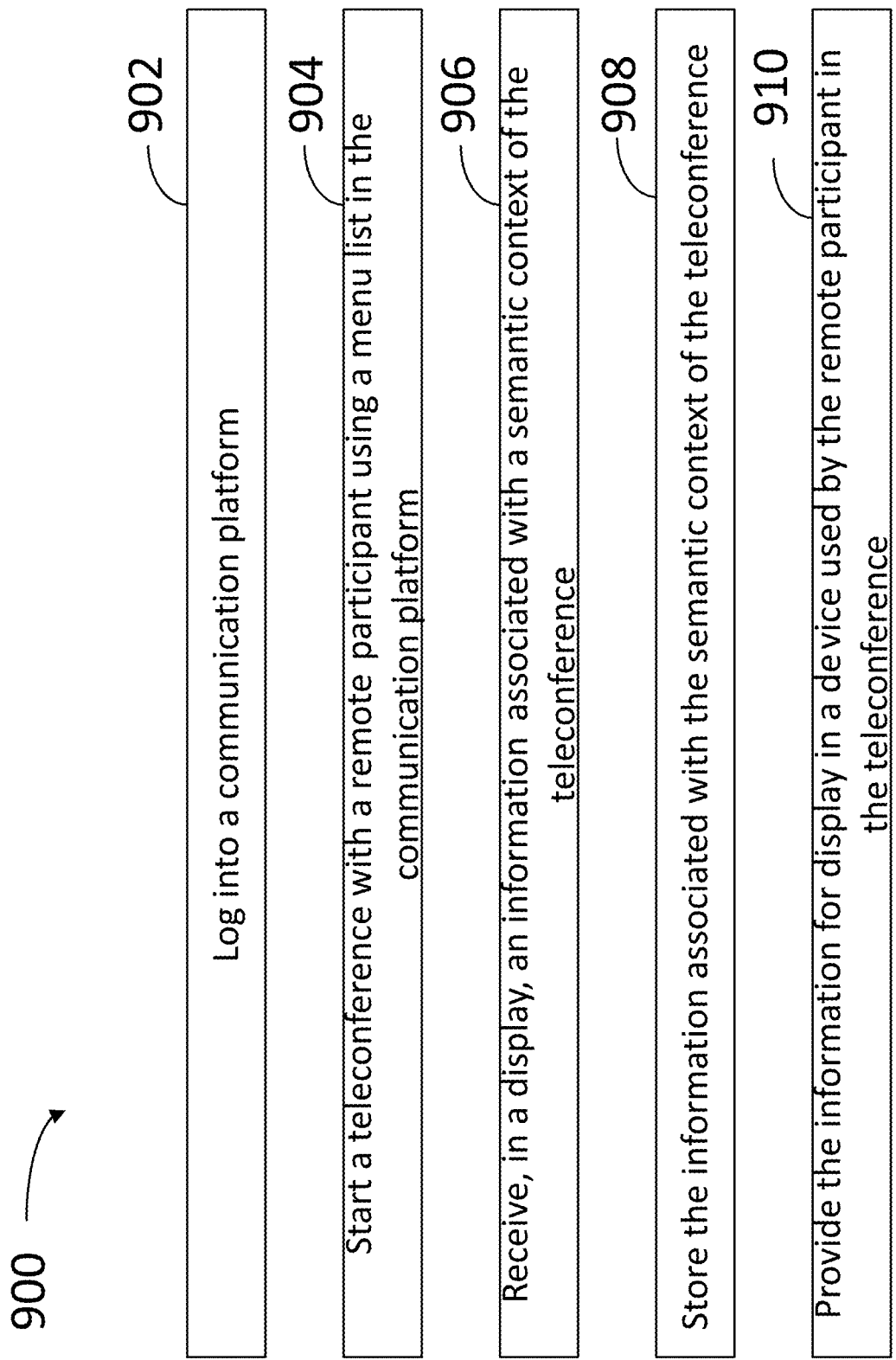
FIG. 9 is a flowchart illustrating steps of a method accessing and providing information relevant to a teleconference, according to some embodiments.

FIG. 9 is a flowchart illustrating steps of a method 900 accessing and providing information relevant to a teleconference, according to some embodiments. For explanatory purposes, the steps of the example method 900 are described herein as occurring in serial, or linearly. However, multiple instances of the example method 900 may occur in parallel. For purposes of explanation of the subject technology, the method 900 will be discussed in reference to a computing platform including client devices, servers and databases interconnected via network, as disclosed above (e.g., client deices 110, servers 130, database 252, network 150, and computing platform 702).

Step 902 includes logging into a communication platform.

Step 904 includes starting a teleconference with a remote participant using a menu list in the communication platform.

Step 906 includes receiving, in a display, an information associated with a semantic context of the teleconference. In some embodiments, step 906 includes downloading the information associated with the semantic context of the teleconference. In some embodiments, the information comprises a link to a network address, further comprising following the link to the network address.

Step 908 includes storing the information associated with the semantic context of the teleconference. In some embodiments, step 908 includes storing a graphic display included in the information, and providing the graphic display to the device used by the remote participant in the teleconference.

Step 910 includes providing the information for display in a device used by the remote participant in the teleconference. In some embodiments, step 910 includes refreshing the display to receive a new information associated with the semantic context of the teleconference.

Hardware Overview

Figure 10:
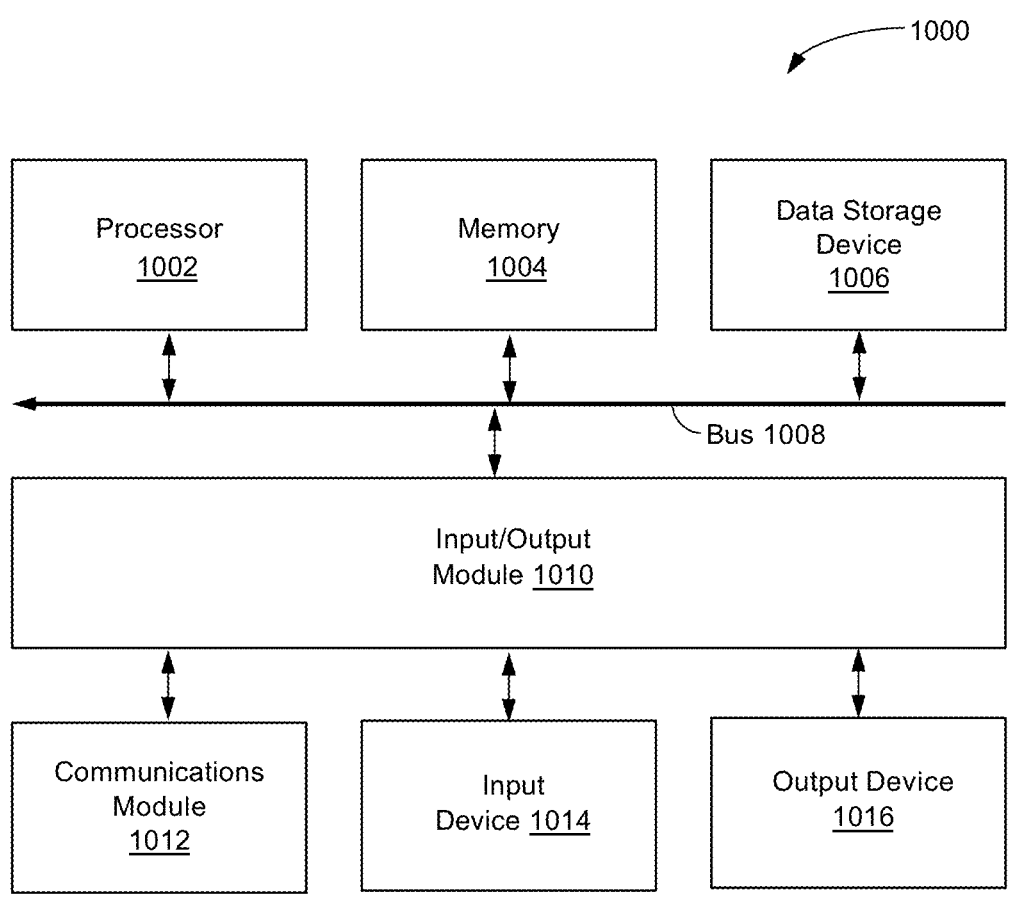
FIG. 10 is a block diagram illustrating an example computer system with which the computing platforms (e.g., client and server) of FIGS. 1, 2, and 7, and the methods of FIGS. 8 and 9 can be implemented, according to some embodiments.

FIG. 10 is a block diagram illustrating an example computer system 1000 with which the computing platforms (e.g., client and server) of FIGS. 1, 2, and 7, and the method of FIGS. 8-9 can be implemented, according to some embodiments. In certain aspects, the computer system 1000 may be implemented using hardware or a combination of software and hardware, either in a dedicated server, or integrated into another entity, or distributed across multiple entities.

Computer system 1000 (e.g., client device 110, server 130, computing platform(s) 702, and remote platform(s) 704) includes a bus 1008 or other communication mechanism for communicating information, and a processor 1002 (e.g., processor(s) 212, 236, and 728) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, a code that creates an execution environment for the computer program in question, e.g., code that constitutes processor firmware, a protocol stack, a database management system, an operating system, or a combination of one or more of them stored in an included memory 1004 (e.g., memories 220 and 232 and electronic storage 726), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, a special purpose logic circuitry.

The instructions may be stored in the memory 1004 and implemented in one or more computer program products, i.e., one or more modules of computer program instructions encoded on a computer-readable medium for execution by, or to control the operation of, the computer system 1000, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 (e.g., communications modules 218 and 238) include networking interface cards, such as Ethernet cards and modems. In certain aspects, input/output module 1010 is configured to connect to a plurality of devices, such as an input device 1014 (e.g., input device 214) and/or an output device 1016 (e.g., output device 216). Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1016 include display devices, such as an LCD (liquid crystal display) monitor, for displaying information to the user.

According to one aspect of the present disclosure, the client device 110 and server 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship with each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein may refer to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    receiving, at a subscriber server, a voice stream from a first participant in a teleconference;
    converting at least a portion of the voice stream into a string of characters;
    selecting a keyword from a subset of the string of characters, wherein the keyword is indicative of a semantic context of the voice stream;
    accessing a network search engine and presenting the keyword as a query for the network search engine;
    receiving a search result returned by the network search engine based on the query;
    analyzing the search result for ancillary content based on the semantic context of the voice stream; and
    providing the ancillary content for display in a device used by a second participant in the teleconference, wherein providing the ancillary content for display in a device used by a second participant in the teleconference comprises removing the ancillary content from the display after a pre-selected period of time has lapsed and pinning the ancillary content to a clipboard in a device of the second participant.

2. The method of claim 1, further comprising downloading, from a content server, the ancillary content from the search result and pointed to by the network search engine, for display in the device used by the second participant in the teleconference.

3. The method of claim 1, wherein providing the ancillary content includes at least one of the following:
   providing a downloaded document related to the semantic context of the voice stream;
   providing a downloaded image related to the semantic context of the voice stream; and
   providing a hyperlink to an online server including information related to the semantic context of the voice stream.

4. The computer-implemented method of claim 1, wherein selecting a keyword from a subset of the string of characters comprises parsing the string of characters with a neural network algorithm to select a salient feature from the string of characters.

5. The computer-implemented method of claim 1, further comprising selecting an identifier from the first participant in the teleconference, accessing a social network account associated with the identifier, downloading a publicly available data from the social network account, and providing the publicly available data from the social network account for display in the device used by the second participant in the teleconference.

6. The method of claim 1, wherein providing the ancillary content comprises providing at least one of news, weather, and/or other current event that is linked to in the search result and pointed to by the network search engine for display in the device used by the second participant in the teleconference.

7. The method of claim 1, further comprising:
   forming a graphic display comprising data from the search result; and
   providing the graphic display to the device used by the second participant in the teleconference.

8. The method of claim 1, further comprising combining data from multiple sources in the search result and pointed to by the network search engine.

9. The computer-implemented method of claim 1, further comprising storing at least a portion of the ancillary content in a recording of the teleconference.

10. A system, comprising:
    one or more processors configured by machine-readable instructions to:
    receive, at a subscriber server, a voice stream from a first participant in a teleconference;
    convert at least a portion of the voice stream into a string of characters;
    select a keyword from a subset of the string of characters, wherein the keyword is indicative of a semantic context of the voice stream;
    access, with a client device, a network search engine, and present the keyword as a query for the network search engine;
    receive a search result returned by the network search engine based on the query;
    analyze the search result for ancillary content based on the semantic context of the voice stream; and
    provide the ancillary content for display in a device used by a second participant in the teleconference, wherein to provide the ancillary content for display in a device used by a second participant in the teleconference the one or more processors execute instructions to remove the ancillary content from the display after a pre-selected period of time has lapsed and pinning the ancillary content to a clipboard in a device of the second participant.

11. The system of claim 10, wherein the one or more processors are further configured by machine-readable instructions to download, from a content server, the ancillary content from the search result and pointed to by the network search engine, for display in the device used by the second participant in the teleconference.

12. The system of claim 11, wherein the ancillary content includes at least one downloaded document related to the semantic context of the voice stream.

13. The system of claim 11, wherein the ancillary content includes at least one downloaded image related to the semantic context of the voice stream.

14. The system of claim 11, wherein the ancillary content includes at least one hyperlink to an online server including information related to the semantic context of the voice stream.

15. A computer-implemented method, comprising:
    logging into a communication platform;
    starting a teleconference with a remote participant using a menu list in the communication platform;
    receiving, in a display, an information associated with a semantic context of the teleconference;
    storing the information associated with the semantic context of the teleconference; and
    providing the information for display in a device used by the remote participant in the teleconference, wherein providing the information for display comprises removing an ancillary content from the display after a pre-selected period of time has lapsed and pinning the ancillary content to a clipboard in a device of the remote participant.

16. The computer-implemented method of claim 15, further comprising downloading the information associated with the semantic context of the teleconference.

17. The computer-implemented method of claim 15, further comprising storing a graphic display included in the information, and providing the graphic display to the device used by the remote participant in the teleconference.

18. The computer-implemented method of claim 15, wherein the information comprises a link to a network address, further comprising following the link to the network address.

19. The computer-implemented method of claim 15, further comprising refreshing the display to receive a new information associated with the semantic context of the teleconference.

* * * * *